(12) United States Patent
Hidehira et al.

(10) Patent No.: US 6,483,565 B1
(45) Date of Patent: Nov. 19, 2002

(54) IN-PLANE SWITCHING MODE LCD DEVICE

(75) Inventors: Masanobu Hidehira, Tokyo (JP); Syouichi Kuroha, Tokyo (JP); Seiichi Matsumoto, Tokyo (JP); Fuminori Tamura, Tokyo (JP)

(73) Assignee: NEC Corporation, Tokyo (JP)

( * ) Notice: Subject to any disclaimer, the term of this patent is extended or adjusted under 35 U.S.C. 154(b) by 100 days.

(21) Appl. No.: 09/693,921

(22) Filed: Oct. 23, 2000

(30) Foreign Application Priority Data

Oct. 22, 1999 (JP) .......................................... 11-301727

(51) Int. Cl.[7] ............................................ G02F 1/1343
(52) U.S. Cl. ......................... 349/141; 345/87; 349/152
(58) Field of Search .............................. 349/141, 33–54

(56) References Cited

U.S. PATENT DOCUMENTS

| | | | | | |
|---|---|---|---|---|---|
| 6,020,867 | A | * | 2/2000 | Shimada et al. | 345/87 |
| 6,219,019 | B1 | * | 4/2001 | Hasegawa et al. | 345/96 |
| 6,262,702 | B1 | * | 7/2001 | Murade | 345/87 |
| 6,320,562 | B1 | * | 11/2001 | Ueno et al. | 345/87 |

* cited by examiner

*Primary Examiner*—Toan Ton
*Assistant Examiner*—Timothy L Rude
(74) *Attorney, Agent, or Firm*—McGinn & Gibb, PLLC

(57) ABSTRACT

An in-plane switching mode LCD panel has a plurality of scanning lines each supplied with a scanning signal at both ends of the each of scanning lines. A common terminal connected to the common electrode for the pixels and a block of scanning terminals to form a terminal block for achieving a uniform driving voltage among the pixels, thereby preventing cross-talk between the pixels and a achieving a uniform driving voltage among the pixels.

13 Claims, 8 Drawing Sheets

FIG. 10

IN-PLANE SWITCHING MODE LCD DEVICE

BACKGROUND OF THE INVENTION

1. (a) Field of the Invention

The present invention relates to an in-plane switching mode LCD (liquid crystal display) device and, more particularly, to an improvement of such a LCD device for a uniform brightness and a higher image quality.

2. (b) Description of the Related Art

LCD panels used for LCD devices are generally categorized by the mode of the liquid crystal into a plurality of types including a TN-mode (twisted nematic mode) LCD panel wherein the LC layer is driven by a perpendicular electric field, and an in-plane switching mode LCD panel, wherein the LC layer is driven by a lateral electric field.

Figure 1A:
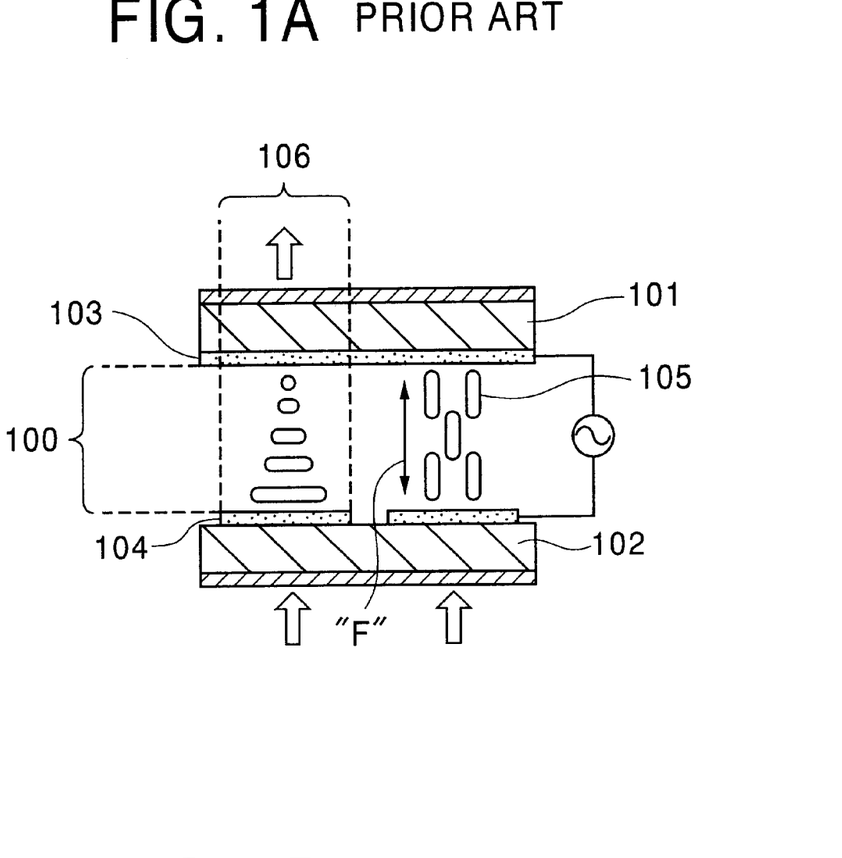
FIG. 1A is a sectional view of a conventional TN-mode LCD panel.
Figure 1B:
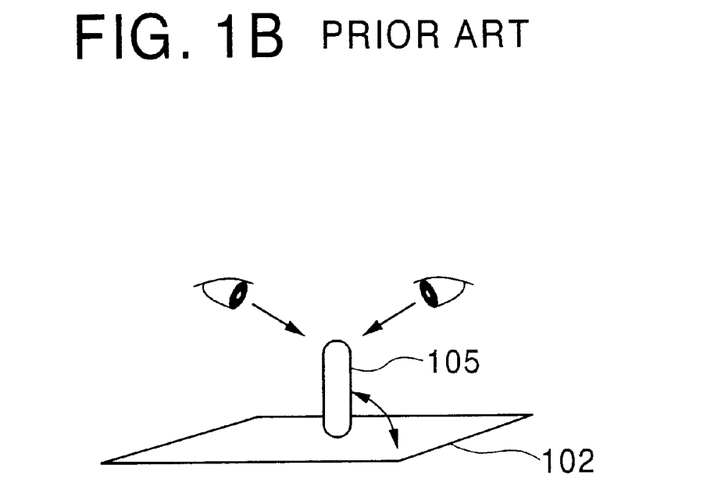
FIG. 1B is a perspective view thereof for showing the view angle dependency thereof.

FIG. 1A shows a TN-mode LCD panel in a sectional view, and FIG. 1B shows the TN-mode LCD panel in a perspective view for illustrating the viewing angle dependency thereof. In the TN-mode LCD panel of FIG. 1A, a perpendicular electric field "F" is generated in a LC layer 100 by a set of electrodes. The term "perpendicular" as used herein means that the electric field is perpendicular to the surfaces of front and rear panels 101 and 102 sandwiching therebetween the LC layer 100. Each of the panels 101 and 102 mounts thereon an electrode layer for generating the perpendicular electric field.

More specifically, the front panel 101 mounts thereon a common electrode 103 at the interface between the LC layer 100 and the surface of the front panel 101, whereas the rear panel 102 mounts thereon a pixel electrode 104 for each of pixels at the interface between the LC layer 100 and the surface of the rear panel 102.

The common electrode 103 is common to all the pixels of the LCD panel and formed on the entire area of the front panel 101. The pixel electrode 104 is separately disposed for each of the pixels whereby each pixel displays the own image based on the data supplied to the pixel electrode 104. The common electrode 103 and the pixel electrodes 104 are made of transparent substance so that the user observes the image on the LCD panel by way of the light passing through these transparent electrodes 103 and 104.

As shown in FIG. 1B, since the LC molecules 105 in the TN-mode LC layer stands upright with respect to the panels 101 and 102 based on the perpendicular electric field, the image on the LCD panel depends on the direction in which the user observes the LCD panel. That is, the LCD panel has a large viewing angle dependency. For example, the effective viewing angle providing an image having a contrast ratio above 10 is limited to around 30° with respect to a perpendicular of the panel as viewed from the upper position, around 20° from the lower position and around ±45° as viewed in the horizontal direction.

Figure 2:
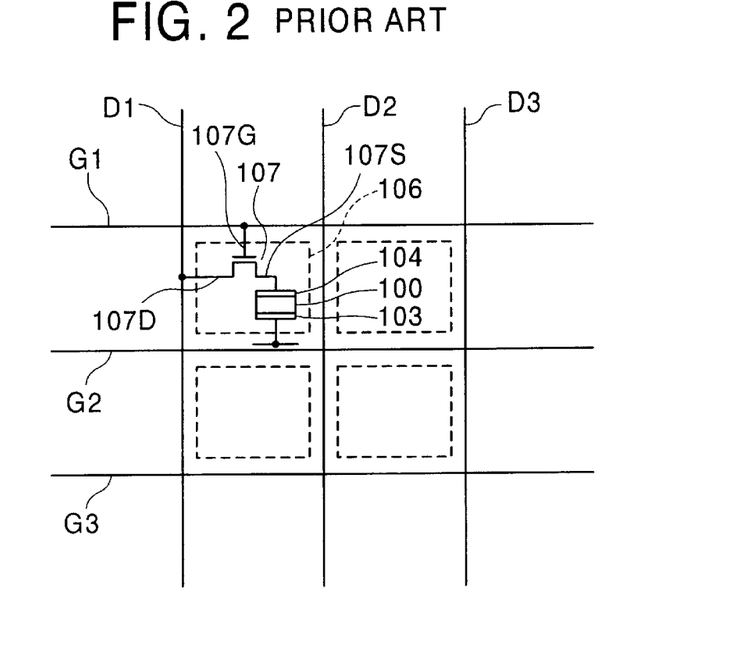
FIG. 2 is an equivalent circuit diagram of each pixel in a typical LCD panel including the LCD panel of FIG. 1A.

FIG. 2 shows an equivalent circuit diagram of the LCD panel shown in FIG. 1A, as viewed from the front thereof. A single pixel 106 includes an equivalent capacitor having a LC layer 100 acting as a capacitor insulator film, and a common electrode 103 and a pixel electrode 104 sandwiching therebetween the LC layer 100, and a thin film MOSFET (TFT) 107 disposed for the pixel electrode 104. The TFT 107 has a source connected to the pixel electrode 104, a drain connected to a corresponding signal line D1 disposed for each column of the pixels, and a gate connected to a scanning line disposed for a row of the pixels.

Figure 3:
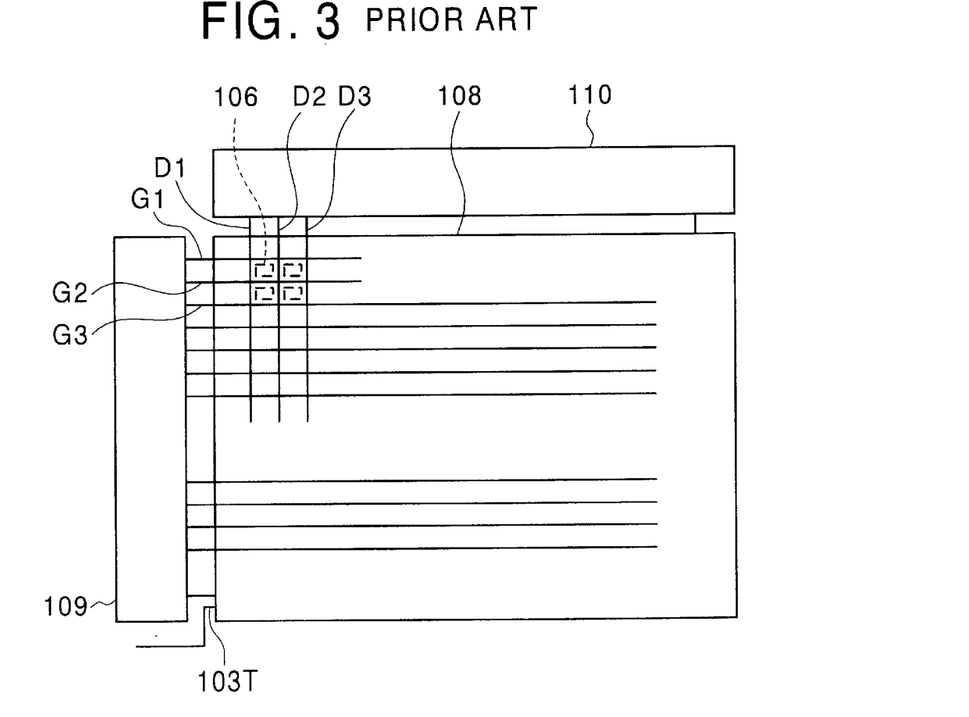
FIG. 3 is a schematic front view of a typical LCD device including the LCD panel of FIG. 1A.

FIG. 3 shows a schematic overall front view of the LCD panel of FIG. 2, wherein a plurality of the pixels 106 shown in FIG. 2 are arranged in a matrix on the screen of the LCD panel 108. A plurality of scanning lines G1, G2, . . . are disposed for respective rows of the pixels 106, whereas a plurality of data lines D, D2, . . . are disposed for respective columns of the pixels 106. The terminals of the scanning lines G1, G2, . . . are connected to respective output terminals of a gate driver 109 disposed at the left side of the LCD panel 108, whereas the terminals of the data lines D1, D2, . . . are connected to respective terminals of a data driver 110 disposed at the top of the LCD panel 108. The terminal 103T of the common electrode 103 is connected to a ground line.

Figure 4A:
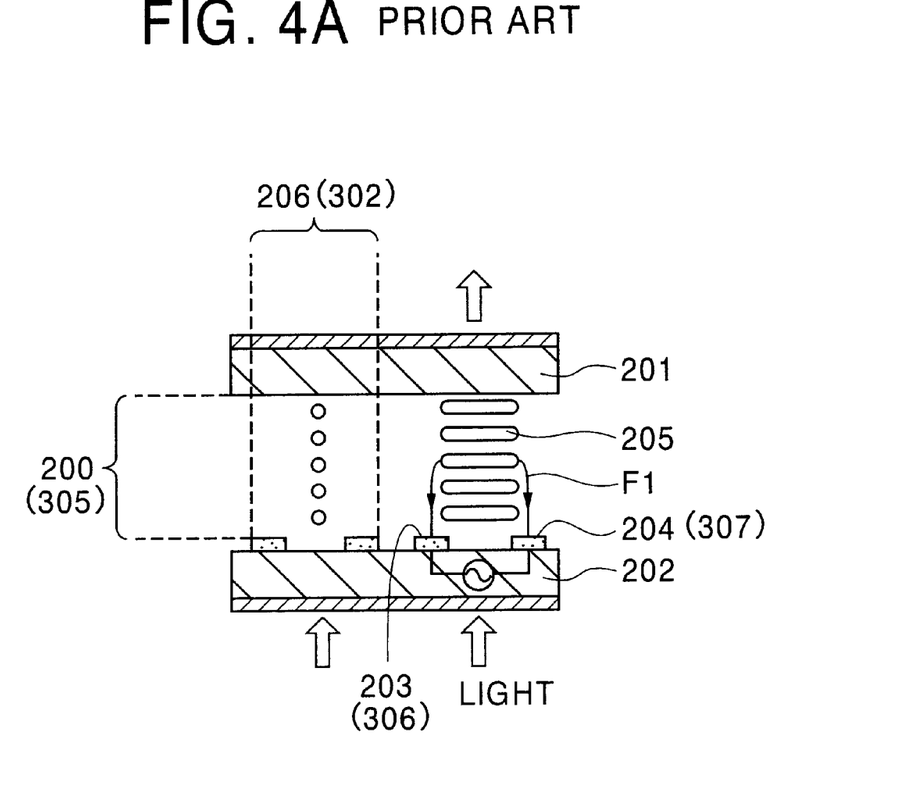
FIGS. 4A is a sectional view of a conventional in-plane switching mode LCD panel.
Figure 4B:
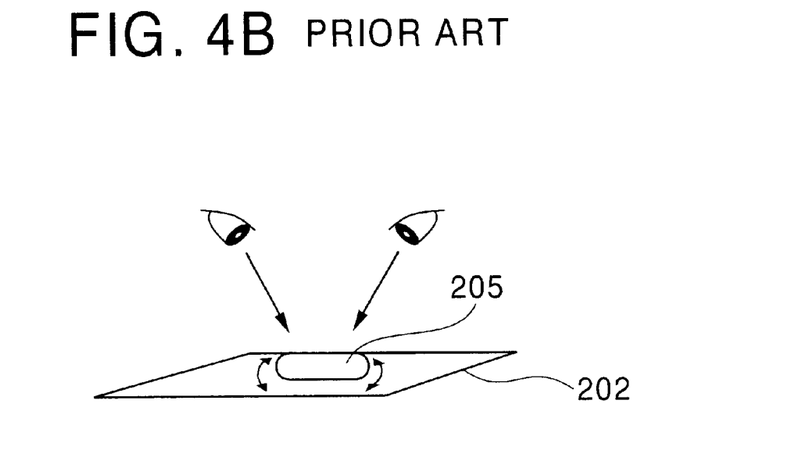
FIG. 4B is a perspective view thereof for showing the view angle dependency thereof.

The in-plane switching mode LCD panel is now replacing the conventional TN-mode LCD panel due to the smaller viewing angle dependency of the in-plane switching mode LCD panel. FIGS. 4A and 4B show the in-plane switching mode LCD panel, similarly to FIGS. 1A and 1B for the TN-mode LCD panel.

In FIG. 4A, the pixel electrodes 204 and the common electrodes 203 are disposed on the rear panel 204, whereby a lateral electric field F1 is formed between the pixel electrode 204 and the corresponding common electrode 203 in each pixel in a direction substantially parallel to the surfaces of both the panels 201 and 202. Other configurations of the in-plane switching mode LCD panel are similar to those of the TN-mode LCD panel shown in FIGS. 2 and 3.

In FIG. 4B, the LC molecules 205 are rotated by the lateral electric field within a plane parallel to both the panels 201 and 203. This configuration affords a smaller difference in the contrast ratio between different angles of the observation by the user. For example, the effective viewing angle of the in-plane switching mode LCD panel affording a contrast ratio of 10 or more is ±70 degrees from the top, bottom, left and right sides in observation.

In the in-plane switching mode LCD panel, the common electrodes, pixel electrodes, common electrode line, scanning lines and data lines are generally made of metallic films disposed on the single rear panel. This necessitates smaller widths or a smaller line pitch for these electrodes and lines for achieving a specific light transmittance ratio (or opening ratio) in each pixel area, compared to the conventional TN-mode LCD panel.

The smaller width raises line resistances to increase the voltage drop along the electrodes and the lines and thereby degrade the uniformity in the brightness among the pixels, especially in a large screen LCD panel. The smaller line pitch for the lines and electrodes increases cross-talks between the pixels. Thus, image quality of the in-plane switching mode LCD panel is degraded.

SUMMARY OF THE INVENTION

In view of the above problems in the conventional in-plane switching mode LCD device, it is an object of the present invention to provide an in-plane switching mode LCD panel having less cross-talks, a uniform brightness and a high image quality by reducing and substantially equalizing the voltage drop among the pixels.

The present invention provides an in-plane switching mode LCD panel including a LC layer, and first and second panels sandwiching therebetween the LC layer to define a plurality of pixels arranged in a matrix, the first panel including a plurality of data lines each disposed for a corresponding column of the pixels, a plurality of scanning lines each disposed for a corresponding row of the pixels, a common electrode line disposed for the plurality of pixels, each of the pixels including a pixel electrode, a common electrode connected to the common electrode line, and a TFT having a source connected to the pixel electrode, a drain connected to a corresponding one of the data lines and a gate connected to a corresponding one of the scanning lines, a common terminal connected to an end of the common electrode line, a plurality of data terminals each connected to an end of a corresponding one of the data lines, a plurality of first scanning terminals each connected to one of ends of a corresponding one of the scanning lines, and a plurality of second scanning terminals each connected to the other of ends of the corresponding one of the scanning lines.

In accordance with the in-plane switching mode LCD device of the present invention, the first and second scanning terminals connected to each scanning line reduces the signal delay caused by the parasitic capacitance and parasitic resistance of each the scanning line, whereby the scanning line may have a smaller width and thus a smaller line pitch compared to the conventional in-plane switching mode LCD panel.

The above and other objects, features and advantages of the present invention will be more apparent from the following description, referring to the accompanying drawings.

PREFERRED EMBODIMENT OF THE INVENTION

Now, the present invention is more specifically described with reference to accompanying drawings.

Figure 5:
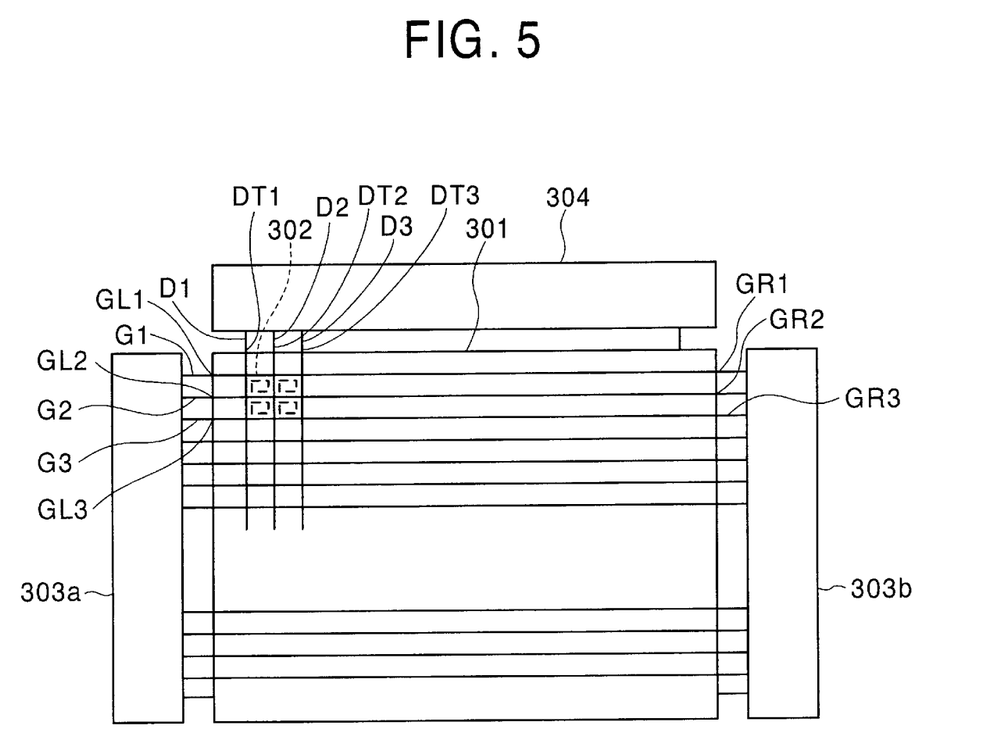
FIG. 5 is a schematic front view of an in-plane switching mode LCD device.

Referring to FIG. 5, an in-plane switching mode LCD device according to an embodiment of the present invention includes a LCD panel 301 having a screen wherein a plurality of pixels 302 are arranged in a matrix, first and second gate drivers 303a and 303b disposed in the vicinities of both left and right sides of the LCD panel 301, and a data driver 304 disposed in the vicinity of the top side of the LCD panel 301.

The LCD panel 301 mounts thereon a plurality of scanning lines G1, G2, . . . each disposed for a corresponding row of the pixels 302, and a plurality of data lines D1, D2, . . . each disposed for a corresponding column of the pixels 302.

Each scanning line G1, G2, . . . is connected at the left side thereof to a left terminal GL1, GL2, . . . which is connected to the first gate driver 303a, and also nnected at the right side thereof to a right terminal GR1, GR2, . . . which is connected to the second gate driver 303b. The first and second gate drivers 303a and 303b have an equal configuration and supply the same gate driving signals through both the left terminals GL1, GL2, . . . and the right terminals GR1, GR2, . . . to the scanning lines G1, G2, . . . .

Each data line D1, D2, . . . has a top terminal DT1, DT2, . . . connected to the data driver 304. The data driver supplies data signals through the data terminals DT1, DT2, to the data lines D1, D2, . . . .

Each pixel 302 of the in-plane switching mode LCD panel 301 is similar to the pixel 206 described with reference to FIG. 4A, and the description for the pixel in the conventional in-plane switching mode LCD panel with reference to FIG. 4A is incorporated herein by reference. The reference numerals between the parentheses apply to the in-plane switching mode LCD panel of the present embodiment.

Figure 6:
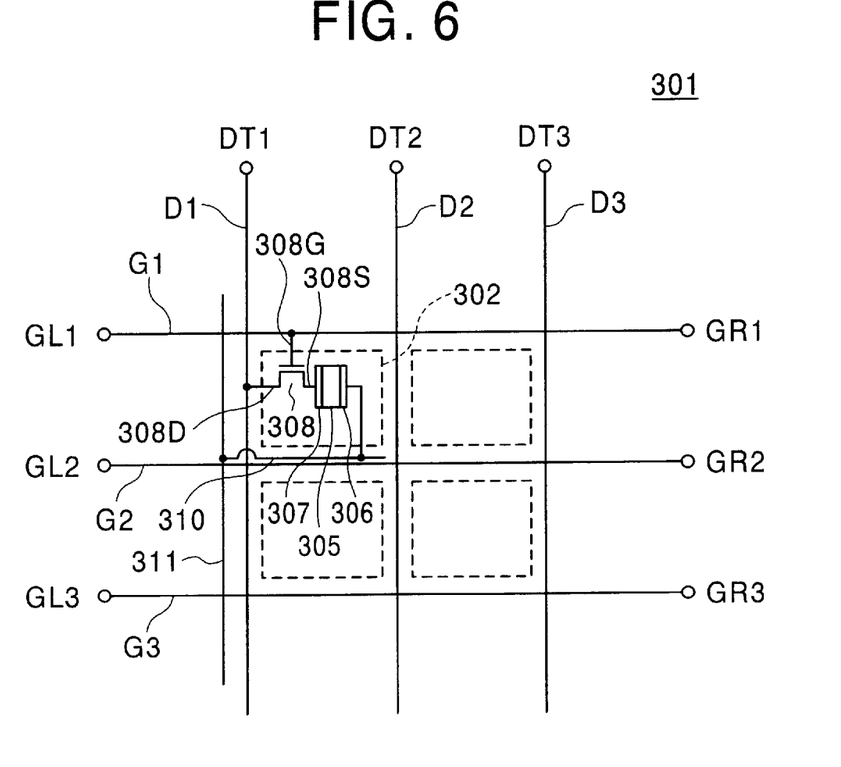
FIG. 6 is an equivalent circuit diagram of each pixel in the LCD device of FIG. 5.

Referring to FIG. 6, each pixel 302 has an equivalent capacitor having a LC layer 305, a common electrode 306 and a pixel electrode 307 sandwiching therebetween the LC layer 305, and a TFT 308 for charging and discharging the equivalent capacitor. The TFT 308 includes a source 308S connected to the pixel electrode 307, a drain 308D connected to a corresponding data line D1, D2, . . . and a gate connected to a corresponding scanning line G1, G2, . . . . The common electrodes 306 of the pixels arranged in a row are connected together by a common electrode branch line 310. The common electrode branch lines 310 for all the rows are connected together by a common electrode bus line 311, which is disposed in the peripheral area of the LCD panel and connected to a common terminal not shown.

The configuration of the LCD device of FIG. 5 wherein a pair of gate drivers 303a and 303b supply the scanning signals at both the terminals GL1, GR1, GL2, GR2, . . . of each scanning line G1, G2, . . . affords an equivalent reduction of the number of pixels and the length of the scanning line in each row of the pixels by half. That is, the parasitic resistance and the parasitic capacitance of each scanning line are reduced to half the actual values, thereby reducing the signal delay along the scanning line, Thus, an undesirable DC voltage component in each pixel and an irregularity of the brightness among the pixels caused by the signal delay are suppressed.

In an alternative, each scanning line has a smaller width corresponding to the reduction of the line resistance, which raises the opening ratio of the pixel, which is generally defined by a ratio of the effective pixel area for an image display to the total pixel area.

Figure 7:
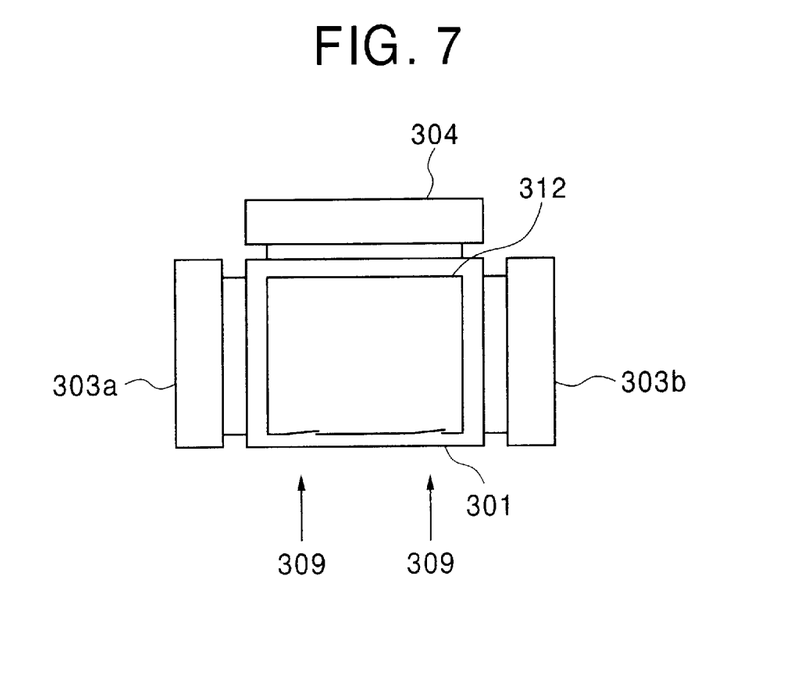
FIG. 7 is an overall view of the LCD device of FIG. 5, showing injection ports of the LCD panel for injecting LC therein.

Referring to FIG. 7, the LCD panel 301 has a pair of injection ports 309 through which liquid crystal is injected into the LCD panel. The injection ports 309 are provided at the bottom side of the LCD panel which has no terminal for the scanning line or data line.

In the LCD panel 301 in the present embodiment, the rubbing direction of the orientation film resides at an angle 20±10 degrees with respect to the perpendicular of the electric field generated between the pixel electrode 307 and the common electrode 306. The rubbing direction of the orientation film determines the initial orientation of the LC molecules. The angle of the rubbing direction with respect to the extending direction of the common electrode 306 and the pixel electrode 307 is selected at a higher value in the case of achieving a higher transmission of the LC layer 305, and selected at a lower value in the case of achieving a higher response of the LC layer 305.

The configuration that the injection ports 309 are provided at the bottom side of the LCD panel 301 reduces the time length for injecting the LC molecules during an initial injection because the LC molecules are injected in a direction substantially parallel to the rubbing direction of the orientation film, or normal to the extending direction of the scanning line. The configuration that the injection ports 309 are disposed at the side where no terminal is disposed enables a plurality of injection ports to be disposed without interference therebetween, which also reduces the time length for injection compared to a single injection port.

Figure 8:
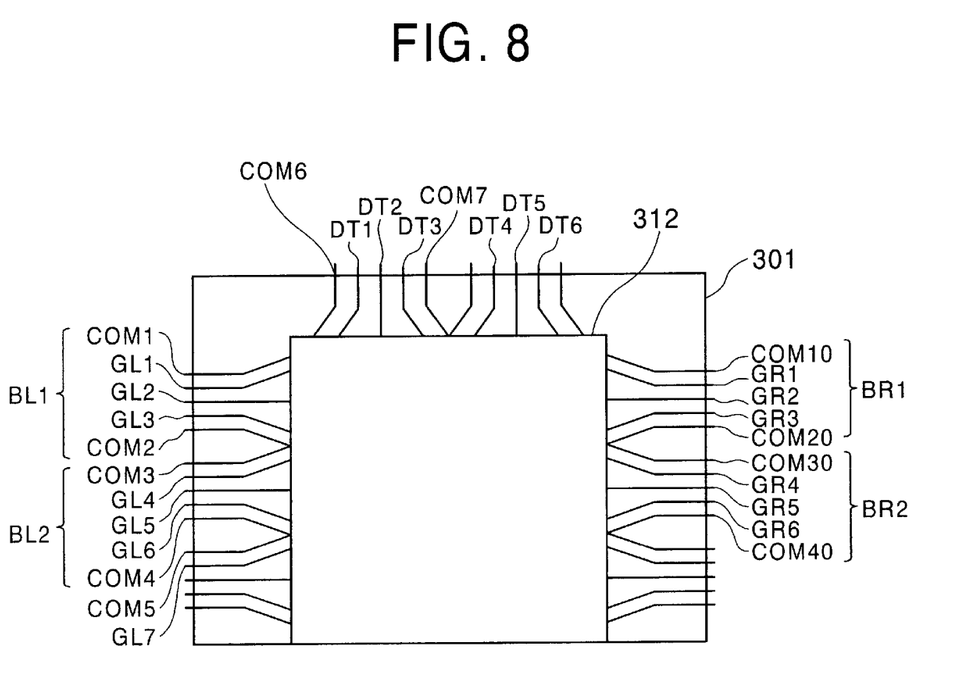
FIG. 8 is a front view of the LCD panel shown FIG. 5, showing the arrangement of terminals for signal lines and electrodes in the peripheral portion of the LCD panel.

Referring to FIG. 8, the LCD panel 301 includes a display area 312 and a peripheral area. The terminals are disposed at the peripheral area outside the display area 312 of the LCD panel 301, and form a plurality of groups BL1, BL2, . . . in each side of the LCD panel 301. More specifically, first three terminals (scanning terminals) GL1, GL2, and G3 for the scanning lines G1, G2 and G3, and a pair of common terminals COM1 and COM2 disposed for sandwiching the three scanning terminals GL1, GL2, and G3 form a first group BL1, next three scanning terminals GL4, GL5 and GL6 and a pair of common terminals COM3 and COM4 form a next group BL2, and subsequent each three scanning terminals and a corresponding pair of common terminals form a group.

The groups BR1, BR2, . . . for the right scanning terminals GR1, GR2, . . . disposed at the right side of the LCD panel 301 are similar to the groups BL1, BL2, . . . of the left scanning terminals GL1, GL2, . . . as recited herein, whereas a specific number of data terminals DT1, DT2 and DT3 and a pair of common terminals COM6 and COM7 also form a single group.

The configuration of the grouping of terminals allows the common electrodes to have a lower line resistance, whereby cross-talk between the pixels and irregularity of the brightness among the pixels can be reduced.

Figure 9:
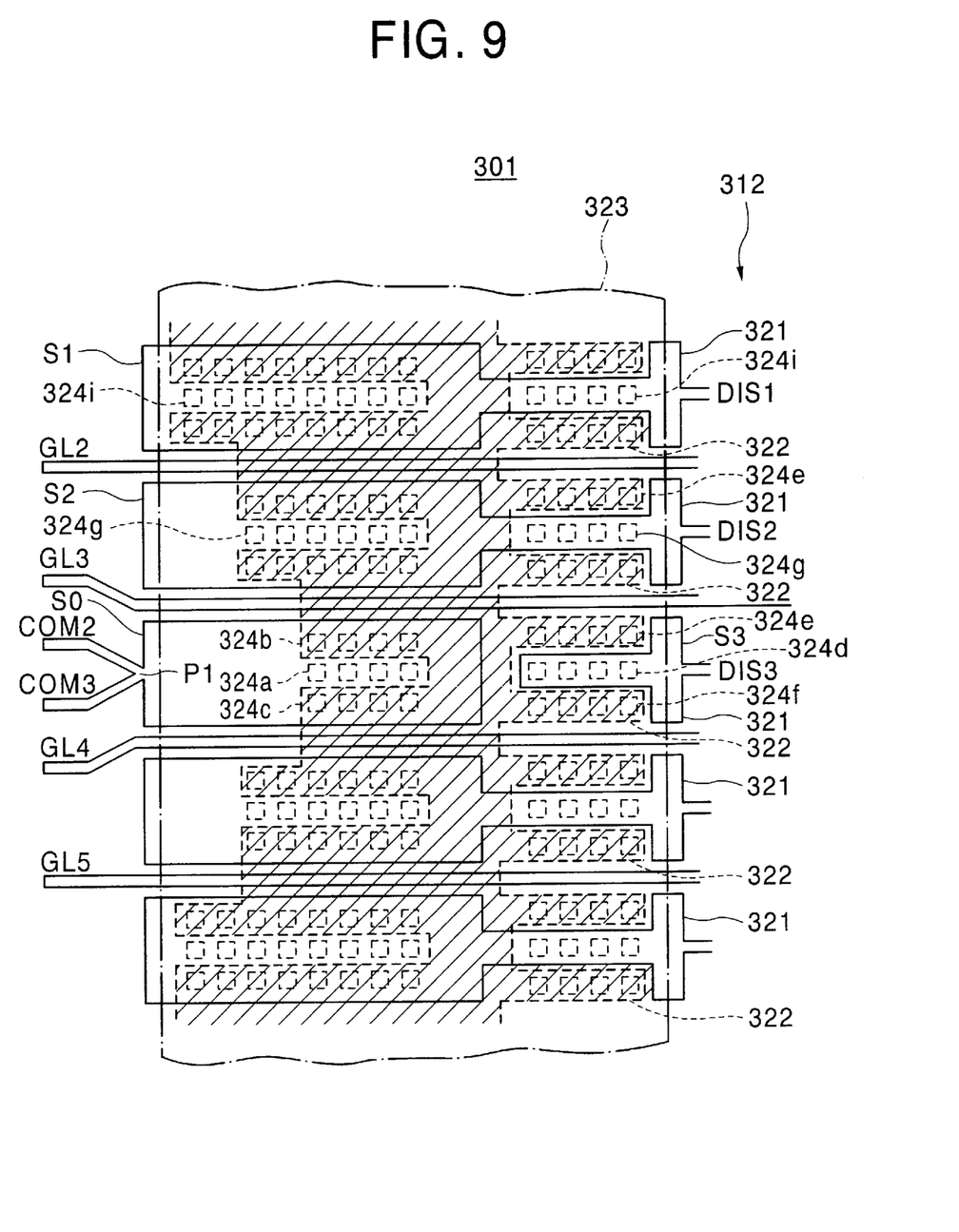
FIG. 9 is a schematic front view of a peripheral area of the LCD panel shown in FIG. 5, illustrating connections between the terminals and pixel areas therein.

Referring to FIG. 9 showing a configuration of a portion of the peripheral area of the LCD panel 301, detail of the conductive layers for implementing the common electrode lines and scanning lines in the peripheral area is exemplified for the terminals disposed at the left side of the LCD panel 301. The common terminals COM1, COM2, . . . are connected to three common conductive layers layered in the direction normal to the panels with an intervention of an interlayer dielectric film between each two of the conductive layers. The tree-layer structure for the common electrode lines achieves uniform line resistance for the common electrodes.

The three-layer structure includes a first conductive layer 321 which is shown by solid lines and implements the scanning lines and common electrode lines, a second conductive layer 322 which is shown by dotted lines with hatching and implements the data lines and common electrode lines and a third conductive layer which is shown by chain lines and implement the common electrode lines. The third conductive layer 323 covers the substantially entire peripheral area shown in FIG. 9.

In FIG. 9, the contact plugs 324 extend from the third conductive layer 323 toward the underlying layers 322 and 321 and stop at the underlying layer 322 or 321 depending on the presence or absence of the second conductive layer 322. More specifically, if there resides a portion of the second conductive layer 322 at the location where a specific contact plug 324 extends, the specific contact plug 324 stops at the portion of the second conductive layer 322. Thus the specific contact plug 324 connects the third conductive layer 323 to the second conductive layer 322. On the other hand, if the second conductive layer 324 does not resides at the location where the specific contact plug 324 extends, the specific contact plug extends to the first conductive layer 321. Thus, the specific contact plug 324 connects the third conductive layer 323 to the first conductive layer 321. The second conductive layer 322 resides at the locations where the contact plugs 324 stop. That is, the second conductive layer 322 is selectively removed in the area where no contact plug resides, thereby achieving a uniform resistance between the common terminal and the pixels denoted by symbols DIS1, DIS2, . . . in the display area 312.

For example, the common terminals COM2 and COM3 shown in FIG. 9 are connected together at node P1 located near the left side of the LCD panel 301 and constituting a portion of the first conductive layer 321.

A pixel DIS3 which is nearest to node P1 among all the pixels DIS1 to DIS3 in the display area 312 is connected to node P1 as follows. First, node P1 is connected to a contact plug group 324*a* and a pair of another contact plug groups 324*b* and 324*c* through a pattern S0 of the first conductive layer 321. The node P1 is then connected to the third conductive layer 323 through the contact plug group 324*a*, and connected to another pattern S3 of the first conductive layer 321 through the third conductive layer 323 and a contact plug group 324*d*, and connected to the nearest pixel DIS3.

The node P1 is also connected to the nearest pixel DIS3 through the contact plug group 324*a*, the third conductive layer 323, other contact plug groups 324*b* and 324*c*, the second conductive layer 322, other contact plug groups 324*e* and 324*f*, the third conductive layer 323, the contact plug group 324*d* and the pattern S3 of the first conductive layer 321.

The node P1 is connected to a farther pixel DIS2, through the pattern S0 of the first conductive layer 321, the contact plug group 324*a*, the third conductive layer 323, another contact plug group 324*g*, another pattern S2 of the first conductive layer 321. The contact plug group 324*g* includes ten contact plugs witch is larger in number compared to the four contact plugs in the contact plug group 324*a*.

The node P1 is also connected to a farthest pixel DIS1 through the path including the half way for the pixel DIS2, another contact plug group 324*i* including twelve contact plugs, and a pattern S1 of the first conductive layer 321.

In the above configuration, the node P1 is connected to the nearest pixel DIS3 through the contact plug group 324*a* and the contact plug group 324*d* each including four contact plugs, whereas the node P1 is connected to the farther pixel DIS2 through the contact plug group 324*g* connecting the third conductive layer 323 and the first conductive layer 321 and including ten contact plugs. The node P1 is also connected to the farthest pixel DS1 through the contact plug group including twelve contact plugs. The configuration wherein a farther pixel is connected to the common terminals COM2 and COM3 through a contact plug group including a larger number of contact plugs connected in parallel achieves a substantially equal line resistance for the common electrodes, whereby the pixels operate with a substantially uniform driving voltage. The configuration of the difference in number of contact plugs in a group may be replaced by a difference in an effective sectional area, such as the width, of the common electrode line.

The second conductive layer 322 which is selectively etched for patterning provides also a uniform line resistance between the common terminal and each pixel.

Figure 10:
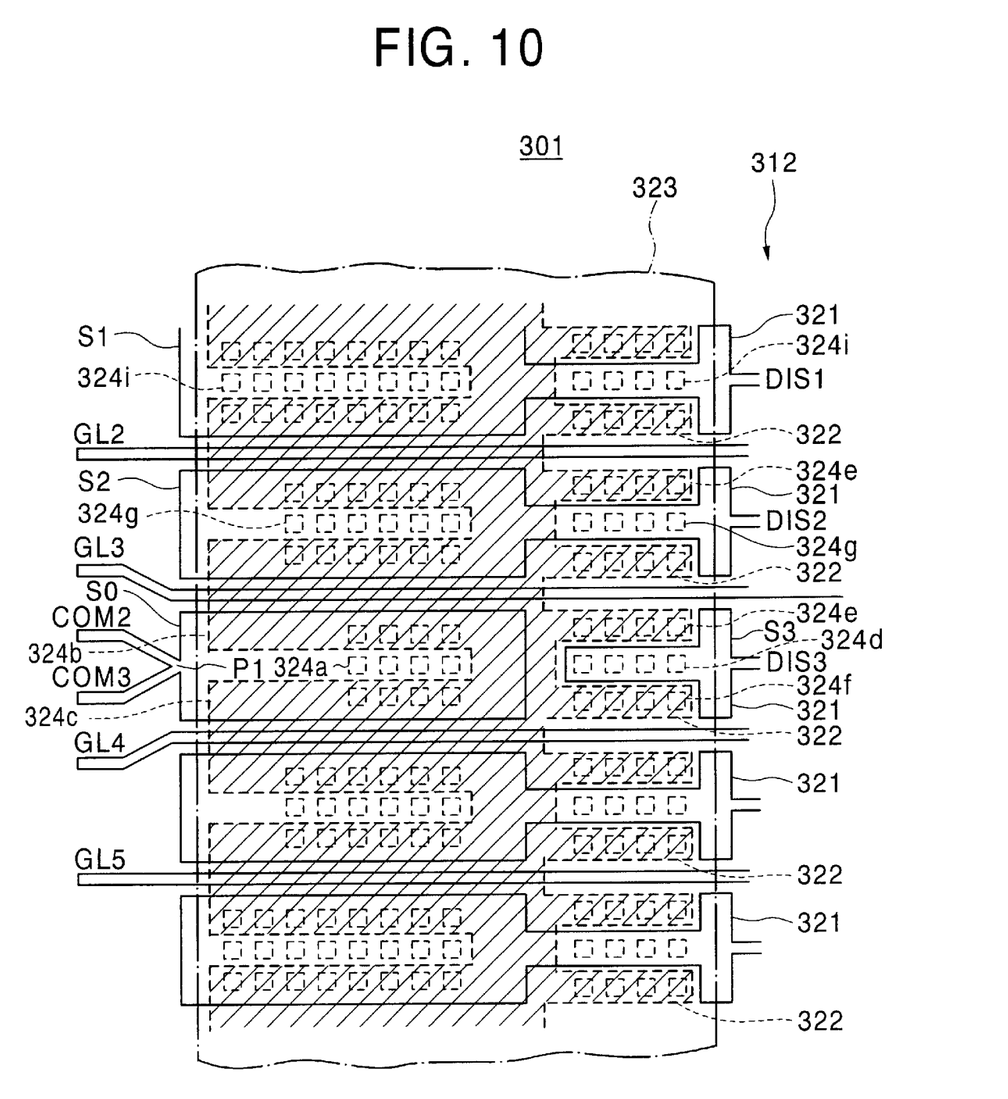
FIG. 10 is a modification from the configuration of FIG. 9.

Referring to FIG. 10, a modification from the configuration of FIG. 9 includes the second conductive layer 322 having a larger area substantially equal to the area for the third conductive layer except for the area for the contact groups. This configuration affords a simple structure compared to the first embodiment, which provides, however, a more uniform line resistance for the pixels.

The right side of the second conductive layer 322 has a comb-shape. More specifically, the second conductive layer is removed at the location wherein the contact plug groups 324 extend between the first conductive layer 321 and the third conductive layer 322, and another location wherein such a contact plug group is not disposed. The comb-shape of the second conductive layer 322 achieves a uniform line resistance for the pixels, whereby a uniform brightness can be obtained.

Since the above embodiments are described only for examples, the present invention is not limited to the above embodiments and various modifications or alterations can be easily made therefrom by those skilled in the art without departing from the scope of the present invention.

What is claimed is:

1. An in-plane switching mode LCD panel comprising a LC layer, and first and second panels sandwiching therebetween said LC layer to define a plurality of pixels arranged in a matrix, said first panel including:
a plurality of data lines each disposed for a corresponding column of said pixels;
a plurality of scanning lines each disposed for a corresponding row of said pixels;
a common electrode line disposed for said plurality of pixels, each of said pixels including a pixel electrode, a common electrode connected to said common electrode line, and a TFT having a source connected to said pixel electrode, a drain connected to a corresponding one of said data lines and a gate connected to a corresponding one of said scanning lines;
at least one common terminal connected to an end of said common electrode line;
a plurality of data terminals each connected to an end of a corresponding one of said data lines;
a plurality of first scanning terminals each connected to one of end of a corresponding one of said scanning lines; and
a plurality of second scanning terminals each connected to the other of ends of the corresponding one of said scanning lines, wherein a first portion of said common electrode line disposed between said at least one of said common terminals and said common electrode of one of said pixels disposed nearer to said at least one of said common terminals has an effective sectional area smaller than an effective sectional area of a second portion of said common electrode line disposed between said at least one of said common terminals and said common electrode of another of said pixels disposed farther from said at least one of said common terminals.

2. The in-plane switching mode LCD panel as defined in claim 1, wherein said first panel is of a quadrilateral having first through fourth sides, said first and second scanning terminals are disposed in vicinities of said first and second sides opposing each other, said data terminals are disposed in a vicinity of said third side.

3. The in-plane switching mode LCD panel as defined in claim 2, further including an injection port disposed in a vicinity of said fourth side for injecting liquid crystal to form said LC layer.

4. The in-plane switching mode LCD panel as defined in claim 2, further including a plurality of injection ports disposed in a vicinity of said fourth side for injecting liquid crystal to form said LC layer.

5. The in-plane switching mode LCD panel as defined in claim 3, wherein said injection port has an injection angle which is substantially normal to an extending direction of said scanning lines.

6. The in-plane switching mode LCD panel as defined in claim 5, where in said injection port has an injection angle which is substantially normal to an electric field generated between said pixel electrode and said common electrode.

7. The in-plane switching mode LCD panel as defined in claim 3, wherein a perpendicular from said injection hole to said third side resides at an angle of substantially 30 degrees or less with respect to an initial orientation of said LC layer.

8. The in-plane switching mode LCD panel as defined in claim 1, wherein said at least one common terminal include a plurality of common terminals, and an electric resistance between one of said common terminals and said common electrode is substantially uniform among said plurality of pixels.

9. The in-plane switching mode LCD panel as defined in claim 8, said plurality of scanning terminals and/or said plurality of data terminals are grouped to form a plurality of terminal blocks, and at least one of said common terminals is disposed for each of said terminal blocks.

10. The in-plane switching mode LCD panel of claim 1, wherein each of said first and second portions include contact plugs, and a number of contact plugs in said first portion is smaller than a number of contact plugs in said second portion.

11. The in-plane switching mode LCD panel as defined in claim 10, wherein each of said first and second portions includes a conductive layer connected to said contact plugs, and said conductive layer has a comb-shape end.

12. An in-plane switching mode Liquid Crystal Display (LCD) panel comprising a Liquid Crystal (LC) layer, and first and second panels sandwiching therebetween said LC layer to define a plurality of pixels arranged in a matrix, said first panel including:
a plurality of data lines each disposed for a corresponding column of said pixels;
a plurality of scanning lines each disposed for a corresponding row of said pixels;
a common electrode line disposed for said plurality of pixels, each of said pixels including a pixel electrode, a common electrode connected to said common electrode line, and a Thin Film Transistor (TFT) having a source connected to said pixel electrode, a drain connected to a corresponding one of said data lines and a gate connected to a corresponding one of said scanning lines;
at least one common terminal connected to an end of said common electrode line;
a plurality of data terminals each connected to an end of a corresponding one of said data lines;
a plurality of first scanning terminals each connected to one of end of a corresponding one of said scanning lines;

a plurality of second scanning terminals each connected to the other of ends of the corresponding one of said scanning lines, wherein said first panel is of a quadrilateral having first through fourth sides, said first and second scanning terminals are disposed in vicinities of said first and second sides opposing each other, said data terminals are disposed in a vicinity of said third side; and an injection port disposed in a vicinity of said fourth side for injecting liquid crystal to form said LC layer, wherein said injection port has an injection angle which is substantially normal to an electric field generated between said pixel electrode and said common electrode.

13. An in-plane switching mode LCD panel comprising a LC layer, and first and second panels sandwiching therebetween said LC layer to define a plurality of pixels arranged in a matrix, said first panel including:

a plurality of data lines each disposed for a corresponding column of said pixels;

a plurality of scanning lines each disposed for a corresponding row of said pixels;

a common electrode line disposed for said plurality of pixels, each of said pixels including a pixel electrode, a common electrode connected to said common electrode line, and a TFT having a source connected to said pixel electrode, a drain connected to a corresponding one of said data lines and a gate connected to a corresponding one of said scanning lines;

at least one common terminal connected to an end of said common electrode line;

a plurality of data terminals each connected to an end of a corresponding one of said data lines;

a plurality of first scanning terminals each connected to one of end of a corresponding one of said scanning lines;

a plurality of second scanning terminals each connected to the other of ends of the corresponding one of said scanning lines, wherein said first panel is of a quadrilateral having first through fourth sides, said first and second scanning terminals are disposed in vicinities of said first and second sides opposing each other, said data terminals are disposed in a vicinity of said third side; and an injection port disposed in a vicinity of said fourth side for injecting liquid crystal to form said LC layer, wherein a perpendicular from said injection hole to said third side resides at an angle of substantially 30 degrees or less with respect to an initial orientation of said LC layer.

* * * * *